United States Patent [19]
Syers

[11] Patent Number: 5,337,701
[45] Date of Patent: Aug. 16, 1994

[54] CRAB CASTLE FOR AN AQUARIUM AND COMBINATION THEREWITH

[76] Inventor: Steven A. Syers, 7900 Birchdale Ave., Elmwood Park, Ill. 60635

[21] Appl. No.: 965,158

[22] Filed: Oct. 23, 1992

[51] Int. Cl.5 .............................................. A01K 63/00
[52] U.S. Cl. ...................................... 119/251; 119/246
[58] Field of Search ........................................ 119/2, 5

[56] References Cited

U.S. PATENT DOCUMENTS

| | | | |
|---|---|---|---|
| 3,057,094 | 10/1962 | Winkelman | 119/5 X |
| 4,204,499 | 5/1980 | Leyva et al. | 119/5 |
| 5,031,572 | 7/1991 | Dana | 119/5 |
| 5,121,709 | 6/1992 | Wechsler | 119/5 |

Primary Examiner—Robert P. Swiatek
Attorney, Agent, or Firm—Charles F. Meroni, Jr.

[57] ABSTRACT

The habitat or castle for maintaining a minicrab within an underwater environment, such as within an aquarium, comprises a top shell which can encase an air bubble therein, and a platform which engages within the top shell to provide a perch for the minicrab within the air bubble. A base is provided which rests within, for example, gravel in the bottom of the aquarium, and a plurality of positionable legs are provided to elevate the habitat above the base plate at one of a plurality of preselected positions available.

36 Claims, 3 Drawing Sheets

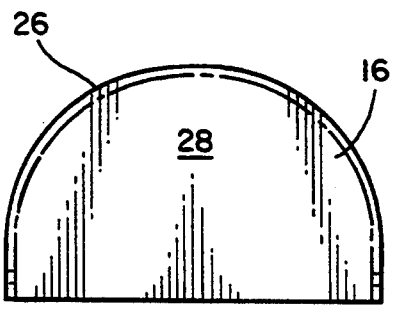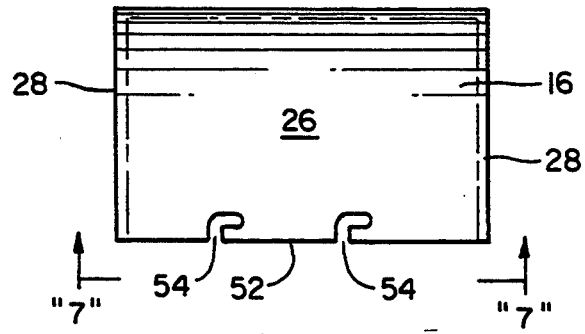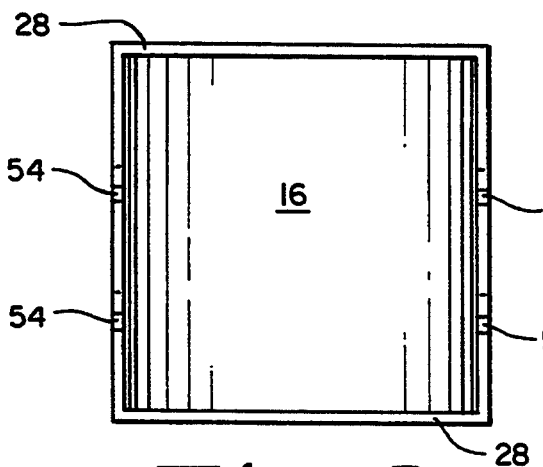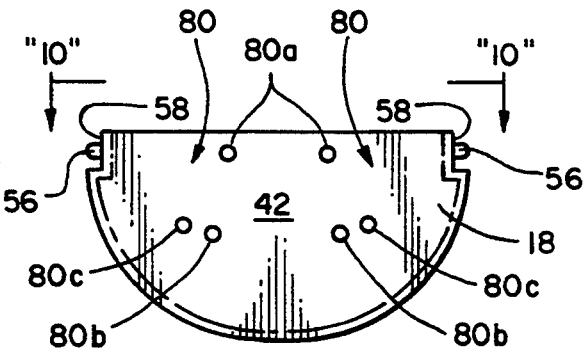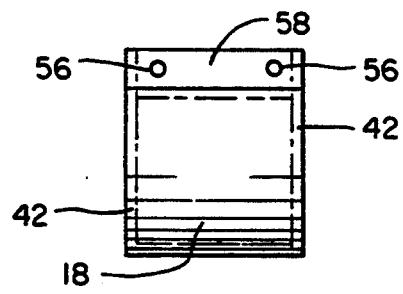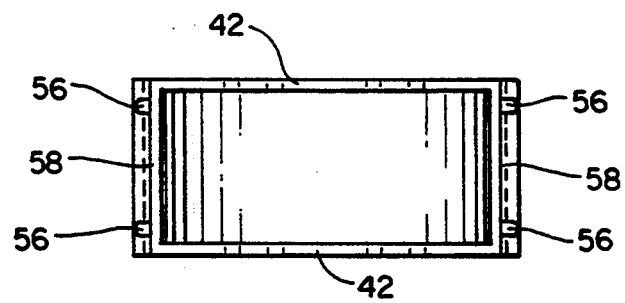

CRAB CASTLE FOR AN AQUARIUM AND COMBINATION THEREWITH

BACKGROUND OF THE INVENTION

1. Field of the Invention

The present invention relates to a crab castle for housing a so-called mini or Fiddler crab in an air filled environment within an aquarium. More specifically, the castle is designed to trap a bubble of air therein, the castle having a platform or perch therein upon which the crab can rest, while in the oxygen rich air bubble.

2. Description of the Prior Art

Heretofore various crab ensnaring structures, commonly referred to as crab pots, have been proposed for use in the crabbing industry, However, it has recently become fashionable to incorporate small crabs, such as the species commonly referred to as the Fiddler crab, within a fresh water aquarium environment.

Such crabs, and most particularly the species Uca Minax, are well adapted to such an environment. They are useful within this environment as well, scavenging off the gravel bed of the aquarium, thereby breaking down particulate matter and increasing efficiency of the filtration system.

Such crabs, however, prefer and inherently do better in, an amphibious environment. If given the opportunity, they will spend the majority of time above the surface of the water.

Also, during periods of growth, the crabs shed their exoskeleton, making them vulnerable to cannibalistic activity, especially when housed in large numbers.

Thus, in order to provide an optimization of healthful conditions for Fiddler crab species to be maintained in an aquarium, the crab castle or habitat of the present invention is proposed.

SUMMARY OF THE PRESENT INVENTION

According to the present invention there is provided a crab habitat for maintenance of a miniature crab within an aquarium, the habitat comprising a top shell having a configuration capable of entrapping an air bubble therebeneath, a platform engaged to the top shell in a manner to rest above a bottom edge of the top shell, a planar base member and a plurality of hinged legs adapted to engage the base member and the platform in a manner to maintain the platform at one of a plurality of predetermined positions above the base.

According to other features of my invention I have provided a new and improved combination which includes an aquarium and a habitat for maintenance of a miniature crab within the aquarium, water in the aquarium, the habitat comprising a top shell having a configuration capable of entrapping an air bubble therebeneath in the water, a narrow platform engaged to the top shell in a manner to rest above a bottom edge of the top shell, a planar base and a plurality of legs adapted to engage the base and the platform in a manner to maintain the platform at a desired position above the base, the hollow platform having ballast for securing the habitat against movement by air when entrapped in the top shell.

BRIEF DESCRIPTION OF THE DRAWINGS

FIG. 5 is a front view of a top shell of the crab habitat.

FIG. 6 is a side view of the top shell of FIG. 5.

FIG. 7 is a top plan view of a crab supporting platform of the habitat.

FIG. 8 is a front view of the platform of FIG. 7.

FIG. 9 is a side view of the platform.

FIG. 10 is a bottom view of the platform.

DESCRIPTION OF THE PREFERRED EMBODIMENT

Figure 1:
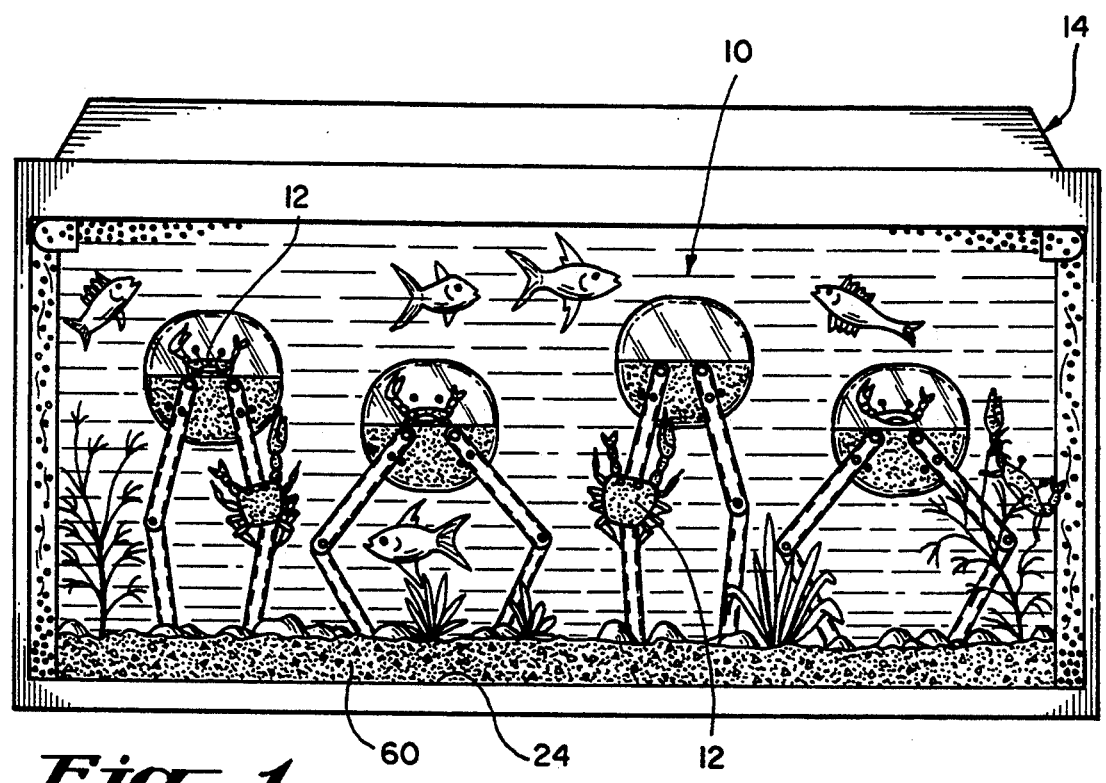
FIG. 1 is a perspective view of an aquarium having a plurality of crab habitats made in accordance with the teachings of the present invention therein.

Referring now to the drawings in greater detail, there is illustrated therein a crab castle or habitat 10 made in accordance with the teachings of the present invention.

As shown in FIG. 1, such crab habitat 10, singularly or in a plurality, is proposed to provide housing for a crab 12, and most particularly for a type of Fiddler crab known in scientific terms as Uca Minax, within the environment of an aquarium 14.

As will be defined in greater detail hereinafter, the habitat includes a top shell 16 under which an air bubble is trapped, a platform or perch 18 upon which a crab 12 can rest, a plurality of legs 20 which provide for adjustable positioning of the habitat 10, and a base 22 (FIG. 4) which rests upon a floor 24 of the aquarium 14, the legs 20 extending upwardly from the base 22 into engagement with the platform 18.

As shown, the top shell 16 is semicylindrical, the semicylinder 26 having end walls 28 creating a chamber 30 therebetween. When this chamber 30 is placed within a fluid environment, an air bubble is ensnared therein, so long as an open surface 32 of the semicylinder 26 remains downwardly directed.

Thus, if a living creature such as a crab 12 could be maintained within the air bubble filling the chamber 30, an amphibious environment for the creature would be created.

For this purpose, the platform 18 is provided. The platform 18 is also semicylindrical, although narrower in extent than the top shell 16. Thus, open areas at 40 are provided between end walls 28 of the top shell 16 and end walls 42 of the platform 18.

It is via these open areas at 40 that a crab 12 gains access onto the platform 18, a top surface 44 of which rests within the air bubble chamber 30.

Because air is inherently lighter than water, the crab habitat 10 tends to want to rise above the level of the water within the aquarium 14. To counteract this effect, the semicylinder 46 forming the platform 18 is hollow, having an open upper surface 44. When this hollow semicylinder 46 is filled with gravel 50, a buoyancy counterforce is provided, stabilizing the upward pull created by the air bubble within the top shell 16.

Figure 4:
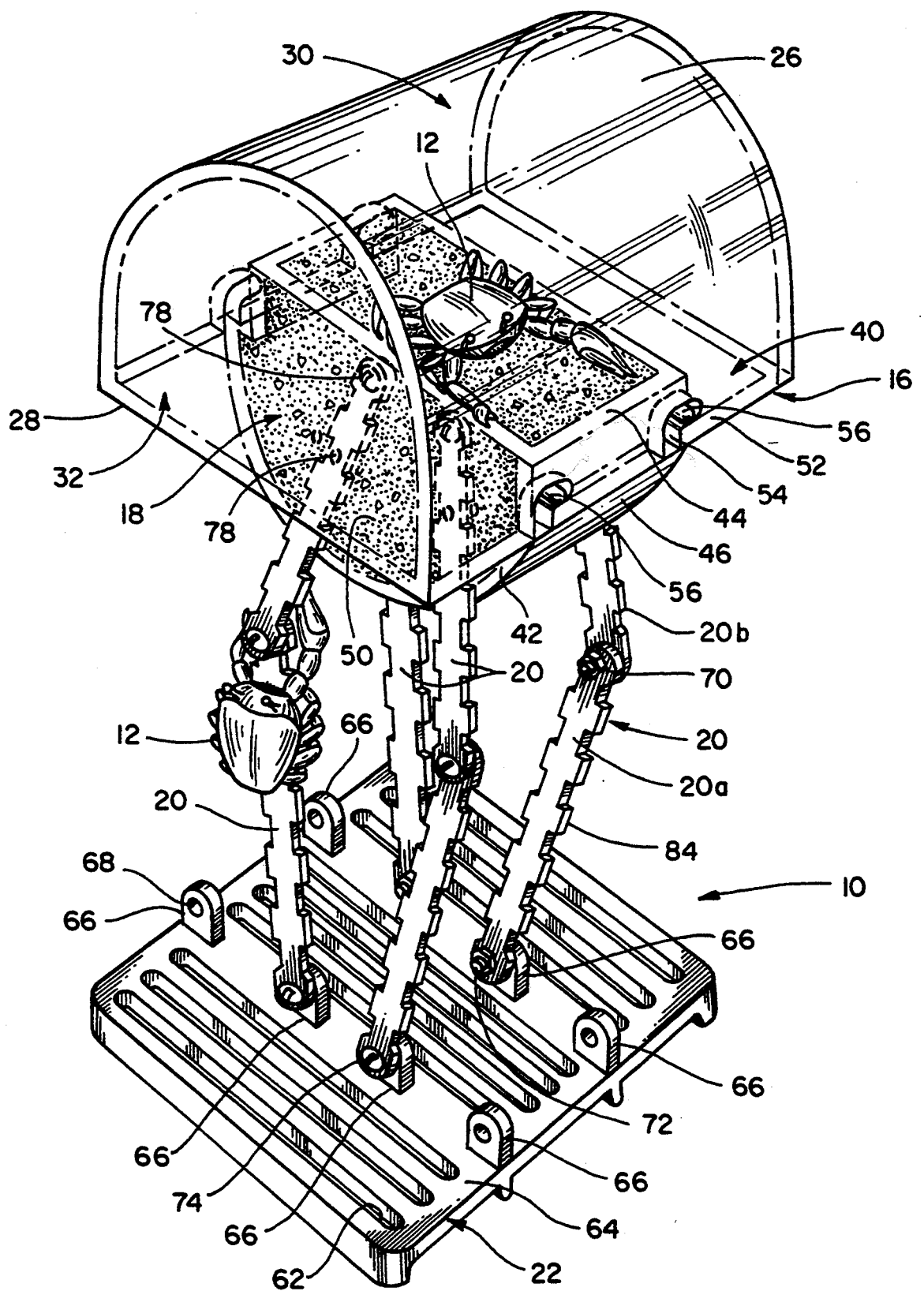
FIG. 4 is an enlarged perspective view of a single crab habitat.

It will be understood that the top shell 16 is firmly held in engagement with the platform 18. Such engagement may be of any appropriate type, however, in a preferred embodiment engagement between the elements 16 and 18 is formed as best shown in FIG. 4.

As seen here, lateral end edges 52 of the top shell 16 have inverted L shaped channels 54 therein within each of which is engaged a coacting peg 56 protruding from an inset end edge 58 of the platform 18 at a position suitable for forming such engagement.

To provide a stable support for the habitat 10, the planar base 22 is provided which can be buried within gravel 60 lying upon the bottom surface 24 of the aquarium 14. The base 22 comprises a planar element having slots 62 therein. Provided on a top surface 64 of the base 22 are a plurality of equally spaced apart pairs of parallel hinge members 66, each hinge member 66 having a centered bore 68 therein. The hinge members 66 of each pair are spaced apart a distance approximately equal to the distance between end walls 42 on the platform 18.

Such spacing is important to offer a vertical engagement of the plurality of legs 20 to and between the base 22 and the platform 18.

Turning now to a study of the legs 20 and the method of their engagement between the base 22 and the platform 18, it will first of all be seen that each leg 20 is of two piece construction.

In this respect each leg is jointed or hinged with each piece of the leg 20 being pivotable about a hinge 70 therein.

It will also be seen that a free end 72 of a bottom leg piece 20a is adapted to be pivotably engaged to a hinge 66 on the base 22, in known manner, and preferably by a stud 74, as shown.

Further, a free end 76 of an upper leg piece 20b is adapted to be fixedly engaged to an end wall 42 of the platform 18. The free end 76 is provided with a pair of spaced apart studs 78 thereon which coact with a pair of a plurality of bores 80 provided in the end wall 42 of the platform 18.

In this respect, as best illustrated in FIG. 8, a pair of mirror image sets of three triangulated openings or bores 80a, 80b and 80c are provided in each end wall 42 of the platform 18.

The studs 78 provided on free end 76 of legpieces 20b are positioned thereon in a manner where they engage with the opening combination 80a and 80b or 80a and 80c. Obviously when the legpieces 20b are engaged in openings 80a and 80c, they are less upright than when engaged in openings 80a and 80b, thus dropping the level at which the platform 18 rests above the base 22.

Likewise, when the free end 72 of the legpieces 20a is engaged to the most lateral pair of hinges 66 on the base 22, this again causes a further drop in the level of the platform 18 as it relates to engaging the legpieces 20a to the innermost pairs of hinges 66 on the base plate 22.

Thus, if a plurality of habitats 10 are desired, they can be placed at varied levels above the aquarium floor 24, as shown in FIG. 1.

Finally, it will be seen that the legs 20 are provided with notches 84 along their length.

These notches 84 are provided to create "steps" for the crab 12 to use during a climb up to the platform 18.

With respect to dimensioning of the habitat 10, one first must consider requirements for creature comfort. For example, for use with the Fiddler crab described herein, consideration must be given to provide adequate space on the platform 18 for one to four crabs 12 to comfortably perch thereon, with claw extension capability. Also, the size of the crab 12 must be taken into consideration when dimensioning the space between the platform 18 and the top shell 16 through which the crabs 12 must be able to fit.

Further, it is proposed to provide an air bubble within the chamber 30 which will only partially deplete after a significant period of time. Thus, the respiration rate of the crab must be taken into account.

To determine an appropriate size for a habitat 10, it is first of all to be understood that an adult crab 12 of the species Uca Minax may be maintained by the oxygen in one cubic inch of air over a period of one and one half days. Thus, it is desired to provide the chamber 30 with a minimum volume of 19.5 cubic inches to provide a thirty day supply of oxygen for one crab 12.

This is not to say that one should wait the full 30 days to replenish the air within the chamber 30. The crab 12 will, by decrease of activity level, or by leaving of the habitat 10, indicate that a replenishment is necessary. To accommodate the size of the crab 12 as well as air supply requirements, it is preferred to create a chamber 30 for a single crab 12 having dimensions of approximately $3 \times 3 \times 2.5$ inches. With respect to the size of the opening at 40 between the top shell 16 and the platform 18, it is preferred that such opening at 40 be at least one inch in width inasmuch as the crab's body dimensions are approximately one inch in length, one inch in height and one and one half inches in width.

Figure 2:
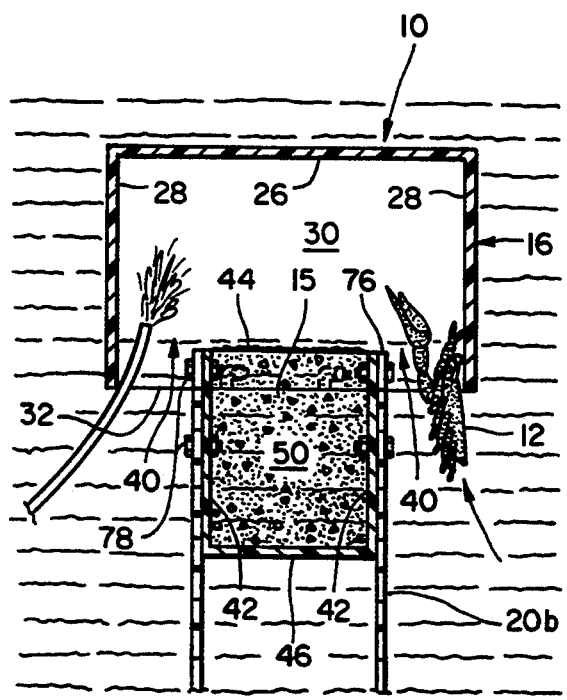
FIG. 2 is a side cross section through a crab habitat.
Figure 3:
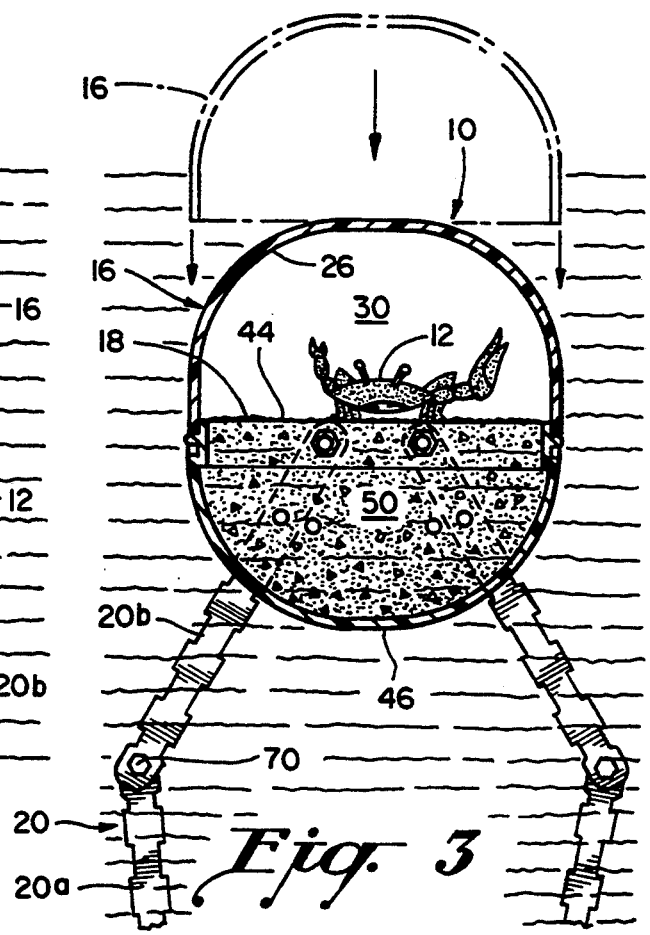
FIG. 3 is a front to back cross section through a crab habitat.

Filling and replenishing of the air chamber 30 may be accomplished by various methods. First an inverted cup (not shown) with an air bubble therein may be tipped below the chamber 30 so bubbles therefrom may rise into and fill the chamber 30. Also, an aquarium air line 88 may be fed into the chamber 30 to fill same as shown in FIG. 2. Further, the top shell 16 may be disengaged from the platform 18, raised into the air thereabove, and then reengaged to the platform as shown in FIG. 3.

It will be understood that the habitat 10 is preferably formed of Plexiglass, to allow a view of the crab 12 therein. Also, the Plexiglass may be colored rather than clear to blend aesthetically with the decor of the aquarium 14.

According to my belief it is a characteristic of the mini crab that the legs must have a means for allowing them to climb to the perch within the air chamber. Thus the legs and the steps on the legs become another important feature for my crab habitat. Mini crabs do not have a capability of swimming, and they are what I would term to be as "climbers". Thus, if the crabs were on the bottom of the aquarium and if they did not have a way to climb up to the perch, the crabs could not gain entry into my air capsule. The hinges on the legs are not absolutely necessary, but constitute a helpful assist for the mini crabs as they enable the habitat to be moved to different positions within the aquarium either upward, downward or sideways as may be desired. If the legs were unhinged, then the habitat would not have this adjustability for allowing the air capsule to be moved to different positions.

In my particular crab castle construction that I have provided, the elevated ballast hopper may not be sufficient to hold the crab habitat assembly in a fixed position within the aquarium. In such event it may also be necessary to have the ballast or the gravel bed at the bottom of the aquarium extended over the base of the crab habitat thereby providing an additional means for stabilizing the crab habitat when it is positioned within an aquarium having water in it about my habitat.

My new crab castle or habitat provides a healthy environment to deter cannibalistic activity especially in a short term environment like in a retail pet store environment.

My crab castle or habitat will house the strongest cannibalistic type crabs because they are the strongest most aggressive types and I have found that they take over a castle and sort of become king of the castle and prevent other mini crabs from entering the crab castle with them. This action operates to separate the non-aggressive mini crabs from the more dangerous mini crabs. It separates them for a time period of up to 90% of the time. The only time they come out is to eat usually, or if the atmosphere in the crab castle becomes uncomfortable such as when the air becomes "stale". Thus my new crab habitat produces a significant effect in the retail environment to enable cannibalistic mini crabs to be housed in large quantities in an aquarium with non-aggressive mini crabs.

Based on my experience, I have found that where the cannibalistic type mini crabs are allowed to spend most of their time with non-cannibalistic type mini crabs that the cannibalistic crabs have the tendency to mutilate the other mini crabs thus making them less saleable. As an example, the cannibalistic type mini crab will nip off the claws or legs of the non-cannibalistic mini crabs on many occasions, and thus if you have a large number of cannibalistic type mini crabs and non-cannibalistic type crabs running together in a tank, then an economic loss will occur because the non-cannibalistic crabs will be rendered less valuable due to having been mutilated by the more aggressive crabs. By providing my new habitat, the amount of time that the different crabs are mixed is reduced thus reducing the amount of mutilation and killing is significantly reduced. I find that the most aggressive killer crabs go to my habitat with the air bubble as these killer crabs crave this air for survival.

As described above, the crab habitat 10 provides a number of advantages, some of which have been described above and others of which are inherent in the invention. Also, modifications may be proposed to the habitat without departing from the teachings herein. Accordingly, the scope of the invention is only to be limited as necessitated by the accompanying claims.

I claim:

1. A habitat for maintenance of a miniature crab within an aquarium, the habitat comprising a transparent hemispherical shaped capsule comprised of a Plexiglass material, the capsule including a semi-hemispherical top shell having a configuration capable of entrapping an air bubble therebeneath, a narrow platform engaged to said top shell in a manner to rest above a bottom edge of said top shell, a planar base and a plurality of legs engaged to said base, hinge means provided on said legs and being adjustable in a manner to maintain the platform at one of a plurality of predetermined positions above the base.

2. The habitat of claim 1 wherein said top shell defines an inverted chamber, the capsule having double entrances to enable a smaller crab to more easily escape from a larger crab, the legs being positioned in proximity to said double entrances for easy entry and exit.

3. The habitat of claim 2 wherein said platform comprises a hollow member having a lateral extent slightly less than a lateral extent of said top shell, the platform being centered relative to said top shell.

4. The habitat of claim 3 wherein said hollow platform is filled with gravel, the gravel forming a top surface of said platform.

5. The habitat of claim 4 wherein said base has a plurality of parallel slots therein.

6. The habitat of claim 5 wherein a plurality of parallel spaced apart pairs of hinge tabs are provided across said base.

7. The habitat of claim 6 wherein one free end of each said hinged legs is adapted to engage one of said hinge tabs in a rotatable manner.

8. The habitat of claim 7 wherein a second free end of each of said hinged legs is adapted to fixedly engage said platform.

9. The habitat of claim 8 wherein said platform includes two vertical side walls, each of said side walls having structure thereon for engaging a corresponding free end of said hinged legs thereto in one of a plurality of predetermined positions.

10. The habitat of claim 9 wherein each end wall has a pair of mirror image sets of openings therein, each set of openings defining a triangle.

11. The habitat of claim 10 wherein said corresponding free end of each said legs includes a pair of in line spaced apart studs thereon, said pair of studs fitting within either a first or second pair of openings within said end wall of said platform.

12. A miniature crab habitat comprising a capsule, the capsule including a top shell defining a chamber, the chamber having a configuration capable of entrapping an air bubble therebeneath, a narrow platform engaged to said top shell in a manner to rest above a bottom edge of said top shell, a planar base, the capsule having double entrances to prevent a weaker crab from becoming trapped inside said chamber by a stronger crab, a plurality of legs secured to said base and said platform in a manner, said legs having pivot means to maintain the platform at a desired position above the base, and means on said legs to assist a miniature crab to climb said legs to rest on said narrow platform within the top shell and an air bubble provided therein.

13. The habitat of claim 12 wherein said top shell is inverted to define the chamber.

14. The habitat of claim 12 wherein said platform comprises a hollow member having a lateral extent slightly less than a lateral extent of said top shell, the platform being centered relative to said top shell.

15. The habitat of claim 14 wherein said hollow platform is filled with ballast, the ballast forming a top surface of said platform, said planar base also having ballast provided thereon to stabilize said habitat when placed in water in an aquarium.

16. The habitat of claim 12 wherein said base has a plurality of parallel slots therein.

17. The habitat of claim 16 wherein said pivot means comprises hinges with the legs being movable in a scissors manner to maintain the platform at one of a plurality of positions above said base, and a plurality of parallel spaced apart pairs of hinge tabs are provided across said base.

18. The habitat of claim 17 wherein one free end of each of said hinged legs is adapted to engage one of said hinge tabs in a rotatable manner.

19. The habitat of claim 18 wherein a second free end of each of said hinged legs is adapted to fixedly engage said platform.

20. The habitat of claim 19 wherein said platform includes two vertical side walls, each of said side walls having structure thereon for engaging a corresponding free end of said hinged legs thereto in one of a plurality of predetermined positions.

21. The habitat of claim 20 wherein each end wall has a pair of mirror image sets of openings therein, each set of openings defining a triangle.

22. The habitat of claim 21 wherein said corresponding free end of each said legs includes a pair of in line spaced apart studs thereon, said pair of pins fitting within either a first or second pair of openings within said end wall of said platform.

23. In combination, an aquarium, and a habitat for maintenance of a miniature crab within the aquarium, the habitat comprising a capsule of a hemispherical shape, the capsule including a top shell, the shell being transparent and defining a chamber having a configuration capable of entrapping an air bubble therebeneath in the water, a narrow semicylindrical platform being in matched engagement with said top shell in a manner to rest above a bottom edge of said top shell, a planar base, a plurality of legs adapted to engage said base and said platform and means connected between the legs and said platform to prevent the capsule from floating to a water surface when submerged in water and in a manner to maintain the platform at a desired position above the base, said narrow platform having ballast for securing the habitat against movement by air when entrapped in the top shell.

24. The combination of claim 23 wherein said top shell defines an inverted chamber.

25. The combination of claim 23 wherein said platform comprises a hollow member having a lateral extent slightly less than a lateral extent of said top shell, the platform being centered relative to said top shell.

26. The combination of claim 23 wherein said legs have hinge means being operable to permit the legs to be adjusted into any one of a plurality of predetermined positions above the base, the capsule having double entrances by said legs between said top shell and said narrow platform to permit easy entry and exit of the miniature crabs.

27. A miniature crab habitat comprising a top shell having a configuration capable of entrapping an air bubble therebeneath, a narrow platform engaged to said top shell in a manner to rest above a bottom edge of said top shell, a planar base and a plurality of legs secured to said base and said platform in a manner to maintain the platform at a desired position above the base, and means on said legs to assist a miniature crab to climb said legs to rest on said narrow platform within the top shell and an air bubble provided therein, said base has a plurality of parallel slots therein, said legs are hinged in a scissors manner to maintain the platform at one of a plurality of positions above said base, and a plurality of parallel spaced apart pairs of hinge tabs are provided across said base.

28. The habitat of claim 27 wherein one free end of each of said hinged legs is adapted to engage one of said hinge tabs in a rotatable manner.

29. The habitat of claim 28 wherein a second free end of each of said hinged legs is adapted to fixedly engage said platform.

30. The habitat of claim 29 wherein said platform includes two vertical side walls, each of said side walls having structure thereon for engaging a corresponding free end of said hinged legs thereto in one of a plurality of predetermined positions.

31. The habitat of claim 30 wherein each end wall has a pair mirror image sets of openings therein, each set of openings defining a triangle.

32. The habitat of claim 31 wherein said corresponding free end of each of said legs includes a pair of in line spaced apart studs thereon, said pair of studs fitting within either a first or second pair of openings within said end wall of said platform.

33. The habitat of claim 27 wherein said legs are provided with hinge means to enable the legs to be pivoted to raise and lower the habitat to a desired height, said means on the legs comprising notches to provide steps so a crab can climb the steps into the habitat.

34. The habitat of claim 33 wherein it is provided with double entrances for enabling crabs climbing the notches on the legs to enter and exit through either of the entrances.

35. The habitat of claim 27 where the habitat is in the shape of a capsule with said top shell forming an upper semi-hemispherical part of the capsule and defining a chamber for an entrapping an air bubble when supported on said planar base.

36. The habitat of claim 35 wherein the chamber preferably has a minimum volume of 19.5 cubic inches to provide a thirty day supply of oxygen for one miniature crab.

* * * * *